United States Patent Office 3,104,162
Patented Sept. 17, 1963

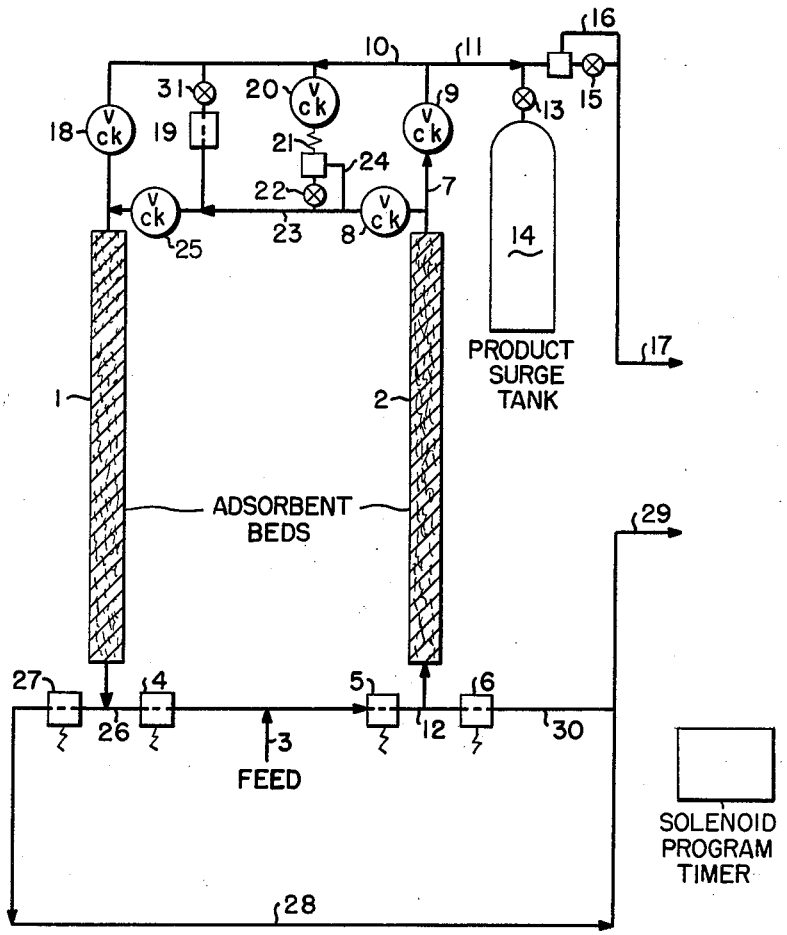

3,104,162
TIMING CYCLE FOR IMPROVED HEATLESS
FRACTIONATION OF GASEOUS MATERIALS
Charles W. Skarstrom, Montvale, N.J., assignor to Esso
Research and Engineering Company, a corporation of
Delaware
Filed May 18, 1960, Ser. No. 30,026
7 Claims. (Cl. 55—58)

The present invention is concerned with an improved method for fractionating gaseous mixtures. The invention relates more particularly to a method for removing one or more key components from a gaseous mixture or gas stream containing such components. The invention comprises a continuation-in-part and an improvement of the process described in co-pending application Serial No. 714,780, filed February 12, 1958, entitled "Method and Apparatus for Fractionating Gaseous Mixtures," inventor Charles W. Skarstrom, now Patent No. 2,944,627, issued July 12, 1960.

The improved process of the present invention comprise the utilization of interconnected and interoperating valves, or the equivalent thereof, whereby the low pressure zone is back-washed with product gas and brought up to the high pressure with product gas. In accordance with the specific adaptation of the present invention, the zone to be desorbed is lowered in pressure rapidly permitting desorbed constituents to be removed therefrom. At a predetermined point as measured with respect to the adsorption cycle, the purge or dump valve is closed and the low pressure zone then brought back to adsorption pressure by the utilization of product gas from the zone undergoing adsorption. While under certain conditions a certain portion of the product gas may be used to back-wash the zone undergoing desorption, a preferred operation is not to utilize product gas as back-wash while the low pressure zone is being desorbed. As pointed out heretofore in accordance with the present invention, the step of repressuring the beds with the product from the product end is carried out during the latter stages of the adsorption cycle.

The invention relates more particularly to a method for removing one or more key components from a gaseous mixture or gas stream containing such components. The invention further relates to such a method as employed for the separation from a gaseous mixture of one or more component contaminants. The invention also relates to a method employed for the purpose of producing an effluent product wherein by removal of one or more components of the original mixture, the percentage concentration of more desirable components is increased in the resulting product. One specific adaptation of the invention relates to the drying of a gaseous mixture, such as air, by removal of water vapor. In addition, the invention relates to a method whereby oxygen is removed from a stream of atmospheric air to increase the concentration of nitrogen in the effluent product stream. The invention is also concerned with the separation of various hydrocarbon gases one from the other, and for the removal of hydrogen, oxygenated compounds and the like from gaseous material containing the same.

In various industrial processes, moisture-free or oxygen- or nitrogen-rich air streams are essential of proper operating procedures. Many methods and a variation of apparatus combinations are known or have been proposed to obtain such ends. Most involve either complicated procedures or equipment expensive to assemble and operate. It is an object of the present invention to provide a simple method which, with minor modification, may be employed in a multitude of situations where the purification or concentration of gaseous mixtures is desired. Specifically, the objects of the present invention may be stated as follows:

(1) To provide a method whereby oxygen and/or nitrogen-rich products may be recovered from atmospheric air without liquefaction or other expensive or complicated procedures.

(2) To provide a method whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors. Also the term "key component" as employed in the following description or claims is used to designate the component or components selectively adsorbed from a stream of a gaseous material initially fed to the system.

The invention and its objects may be more fully understood from the following description when it is read in conjunction with, and with reference to the accompanying drawing. The drawing is a diagrammatic showing of an apparatus according to the present invention, illustrating flow connections and controls adapted to accomplish the method contemplated.

Referring to the drawing numerals 1 and 2 each designates one of a pair of adsorber vessels. Each vessel is adapted to contain and to be substantially fully packed with adsorbent material, to be later described in greater detail. Numeral 3 designates a feed line the flow of which is controlled by inlet valves 4 and 5. Thus as shown feed is introduced into zone 2 through open valve 5. Feed cannot flow through closed valve 4. Due to the fact that valve 6 is closed the feed flows upwardly through line 12 and into zone 2 and contacts adsorbent contained therein. Unadsorbed constituents are removed from the top of zone 2 through line 7. These upwardly flowing gaseous constituents cannot pass through check valve 8. These constituents, however, flow through check valve 9 and thence are distributed into lines 10 and 11. Adsorption zone 2 is at a predetermined elevated pressure. A portion of the gaseous constituents flowing through line 11 pass through valve 13 and into a product purge tank 14.

The remainder of the gaseous constituents pass through valve 15, the rate of flow of which is controlled by rate of flow controller 16 which maintains a predetermined pressure drop across valve 15. These product gaseous constituents are removed by means of line 17 and handled as desired. The gaseous constituents flowing through line 10 cannot flow past check valve 18 nor through valve 19 during the early part of the cycle. In one type of operation gases from line 10 flow downwardly past check valve 20 which is spring loaded by means of spring 21 and through valve 22 into line 23. In a preferred operation no back-wash during desorption is used; therefore, no gases pass through 22.

The rate of flow of these constituents through valve 22 is controlled by rate of flow controller 24. The gaseous constituents flowing through line 23 pass through check valve 25 and back-wash into low pressure zone 1 which is being desorbed. At this point the gaseous constituents cannot flow past valve 18 due to the high pressure existing in line 10. The gaseous constituents flow through zone 1 desorbing from the adsorbent previously adsorbed constituents. This back-wash product from zone 2 together with desorbed constituents from zone 2 are removed by means of line 26. These constituents flow through valve 27, through line 28 and are withdrawn from the system by means of line 29. These constituents cannot flow through closed valve 4.

Valves 27, 4, 5 and 6 are solenoid operated valves or equivalent and are controlled to operate in an interrelated manner as hereinafter described by solenoid program timer 30 or equivalent. Valves 9, 20, 18, 8 and 25 as shown are check valves or equivalent which permit flow of fluid in only one direction.

One specific method of operating as shown on the FIGURE is as follows. The feed gas comprising hydrogen and hydrocarbon is introduced into zone 2 by means of line 3. This feed passes through an open solenoid operated valve 5 and is then introduced into the bottom of zone 2. Both zones 1 and 2 are packed with activated carbon. Substantially pure hydrogen is removed from the top of zone 2 by means of line 7. The hydrogen flows through check valve 9 and cannot pass through valve 8. The hydrogen then is divided. A portion of the same passes through line 11 while the remainder passes through line 10. A portion of the hydrogen passing through line 11 passes through valve 13 and is introduced into a product surge tank 14. The remainder of the hydrogen in line 11 passes through a rate of flow valve 15, the rate of which is adjusted by a flow controller 16 which maintains predetermined pressure differential across the valve. Product hydrogen is withdrawn by means of line 17.

That portion of the hydrogen removed by means of line 10 is passed through check valve 20, through rate of flow valve 22 and then into line 23. The rate of flow through valve 22 is maintained at the desired rate by flow controller 24 which maintains the desired pressure drop across valve 22. In addition, valve 20 is spring loaded by means of spring 21 so as to only open after predetermined pressure drop occurs across valve 20. However, as pointed out heretofore an operation may be carried out without back-wash during desorption.

The hydrogen removed through line 23 passes through check valve 25 and into the top of zone 1 where it backwashes downwardly through the bed. Bed 1 is maintained at a predetermined pressure below the pressure existing in adsorption zone 2. The hydrogen together with adsorbed constituents is removed from the bottom of zone 1 through line 26. This stream passes through solenoid operated valve 27 through line 28 and is withdrawn from the system by means of line 29 and further processed or handled as desired. Thus, when zone 2 is on adsorption and zone 1 on desorption valves 5, 9, 13, 15, 2 and 22 are open, whereas valves 6, 8, 18 and 19 are closed. At the end of the cycle when valve 27 closes, valve 5 remains open until zone 1 reaches the predetermined high pressure. At this point valve 4 opens and valve 5 closes.

The cycle is then continued as hereinbefore described wherein zone 1 is on adsorption and zone 2 is on desorption. A portion of the product hydrogen flowing through valve 18 is used to back-wash zone 2, a portion is used to repressure surge tank 14 and the remainder is passed through line 17 as product hydrogen. The hydrogen and desorbed components from zone 1 are passed through open valve 6, through line 30, and are withdrawn from the system through line 29.

In essence the two adsorbent beds are alternately connected to the high pressure feed. While one bed is at high pressure the other bed is dumped to the low pressure, back-washed with some of the high purity product $H_2$ through a flow control valve 22 and brought back up to line pressure with pure $H_2$ product. Five 2-way electric solenoid valves are used. These on-off valves are operated from a multicam recycling electric timer 30. The use of two on-off feed and two on-off dump valves allows the low pressure bed 1 to be repressured via valve 19 before the other bed is dumped. This insures continuity in the product pressure and flow.

Also in accordance with the present process by repressuring downward with the pure product gas has two desirable features. Inrushing gases from above tend to keep the spring loaded bed of particles well packed. This makes movement with consequent attrition of the particles negligible. Repressuring with pure product gas instead of feed eliminates the very fast inflow of feed. When repressuring with feed, the high space velocity of the incoming gas causes the fronts of the adsorbing components to be moved an excessive amount toward the product end. By recharging with product from the other bed which is at high pressure, the increased feed space velocity to provide this extra demand for $H_2$ is kept at a minimum. It is further minimized by a product surge tank.

To accomplish repressuring with the product, an on-off electric solenoid valve is installed to by-pass the purge flow control 24. The program timer is adjusted so that the instant a dump valve 27 closes on a low pressure bed, the repressuring valve 19 opens. This allows pure product to fill that bed to the full line pressure. A throttling valve 31 allows the rate of repressuring to be adjusted as desired. After the bed has reached full line pressure, its feed valve 4 is opened. Simultaneously, the feed valve 5 to the spent bed is shut. Finally, both the dump valve to the spent bed opens 6 and the repressuring valve 19 shuts off. The spent bed dumps to the low pressure and its purge with pure product commences.

Also to derive the maximum benefit of the pure product used as purge, the purge flow is delayed until the spent bed has nearly reached its lowest pressure. The purge flow then begins. The purge is thus used at maximum expanded volume. This is accomplished by use of a spring loaded check valve (relief valve 20) ahead of the purge flow controller 22. In the tests to make pure $H_2$, the spring loaded check was set to blow by at 130 p.s.i. differential pressure. Full line feed pressure was 155 p.s.i.g. Thus, the purge flow was delayed until the pressure in the spent bed had blown down to 155−130=25 p.s.i.g. The operation was satisfactory.

In essence, the invention comprises an operation wherein the zone to be desorbed is rapidly lowered to the desorption pressure thereby permitting the desorbed constituents to backflow countercurrent in direction to the feed stream when said zone is on the adsorption cycle. Meanwhile, the other zone is undergoing adsorption. In general, the zone being desorbed is maintained at the relatively low desorption pressure until substantially no gas flow exists from the zone. At this point the dump valve is closed and a portion of the product gas from the zone undergoing adsorption is permitted to flow into the product end of the low pressure zone thereby bringing this low pressure zone up to the relatively high adsorption pressure. In general, the low pressure on the zone undergoing adsorption should be maintained until about 50 to 85% of the adsorption cycle is complete in the zone on adsorption. At this point a portion of the product gas from the adsorption zone is introduced into the product end of the low pressure zone until this zone attains the adsorption high pressure. This high pressure on the zone being repressurized should be attained when about 90 to 95% of the adsorption cycle is completed. Also, in accordance with the preferred adaptation of the invention, the repressuring of the low pressured zone should occur when about 75 to 80% of the adsorption cycle is completed. Thus, for example, if the cycle should be about two minutes, the zone undergoing desorption is brought up to the high adsorption pressure during the second one minute.

What is claimed is:

1. A process for the removal of a key component from a gaseous mixture stream utilizing a first and a second adsorbent bed each of which is characterized by having a one end and another end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging said gaseous mixture stream from said first bed as a primary effluent product; reducing the pressure at said one end of said second bed, desorbing said key component from said second bed in reverse flow from said other end to said one end, whereby as said initial cycle continues, said first bed becomes relatively saturated with said key component progressively from said one end toward said other end, and whereby said second bed becomes relatively free from said key component from said other end toward said one end; discontinuing the desorption of said key component from said second bed at a time corresponding to the completion of 50 to 85% of the adsorption cycle on said first bed; utilizing primary effluent from said first bed to repressure said second bed at said other end to said relatively high pressure, thereafter flowing a feed stream of a gaseous material into said second bed at said one end; reducing the pressure on said first bed at said one end, whereby said key component will be desorbed and pass in reverse flow from said other end to said one end; discontinuing the desorption of said first bed prior to the time when said second bed becomes saturated with said key component and repressuring said first bed from said other end with product from said second bed and thereafter continuing the cycle.

2. A process for the removal of a key component from a gaseous mixture stream utilizing a first and a second adsorbent bed each of which is characterized by having a one end and another end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging said gaseous mixture stream from said first bed as a primary effluent product; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said initial cycle, whereby as said initial cycle continues, said first bed becomes relatively saturated with said key component progressively from said one end toward said other end, and whereby said second bed becomes relatively freed from said key component from said other end toward said one end; discontinuing the desorption of said second bed at a time corresponding to the completion of 50 to 85% of the adsorption cycle on said first bed, repressuring said second bed at said other end with product from said first bed; thereafter introducing said feed stream into said one end of said second bed in positive flow direction at said initial relatively high pressure; discharging said gaseous mixture stream from said other end of said second bed as a primary effluent, segregating a portion of said last named primary effluent as a product stream and withdrawing the same; passing the remainder of said last named primary effluent in reverse flow from said other end to said one end through said first bed of adsorbent at said relatively low pressure; discontinuing the desorption of said first bed prior to the time when said second bed becomes saturated; repressuring said first bed at said other end with product from said second bed, and thereafter cyclically continuing the operation.

3. The process of claim 2 wherein said bed on desorption is repressured at a time when 75 to 80% of the adsorption period of said bed on adsorption is complete.

4. The process of claim 2 wherein said gaseous mixture contains hydrogen and said hydrogen is recovered as the product stream.

5. A process for the removal of a key component from a gaseous mixture stream utilizing a first and a second adsorbent bed each of which is characterized by having a one end and another end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging said gaseous mixture stream from said first bed as a primary effluent product; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said initial cycle, whereby as said initial cycle continues, said first bed becomes relatively saturated with said key component progressively from said one end toward said other end, and whereby said second bed becomes relatively freed from said key component from said other end toward said one end; discontinuing the desorption of said second bed at a time corresponding to the completion of 50 to 85% of the adsorption cycle on said first bed, repressuring said second bed at said other end with product from said first bed; thereafter introducing said feed stream into said one end of said second bed in positive flow direction at said initial relatively high pressure; discharging said gaseous mixture stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure; discontinuing the desorption of said first bed prior to the time when said second bed becomes saturated; repressuring said first bed at said other end with product from said second bed, and thereafter cyclically continuing the operation; and wherein substantially the sole transfer of heat to said remainder of said primary effluent occurs in said beds.

6. The process of claim 5 wherein said bed on desorption is repressured at a time when 75 to 80% of the adsorption period of said bed on adsorption is complete.

7. The process of claim 5 wherein said gaseous mixture contains hydrogen and said hydrogen is recovered as the product stream.

References Cited in the file of this patent

UNITED STATES PATENTS 2,944,627    Skarstrom             July 12, 1960
2,955,673    Kennedy et al.        Oct. 11, 1960